United States Patent [19]

Schneider

[11] Patent Number: 5,125,465
[45] Date of Patent: Jun. 30, 1992

[54] FAST RETAIL SECURITY WEIGHING SYSTEM

[76] Inventor: Howard Schneider, 149 Finchley Road, Montreal, Quebec H3X 3A3, Canada

[21] Appl. No.: 650,027
[22] Filed: Feb. 4, 1991
[51] Int. Cl.⁵ .................. G01G 19/52; G01G 19/40; A47F 9/04
[52] U.S. Cl. ................... 177/50; 177/25.15; 186/61
[58] Field of Search ............... 177/50, 25.15; 186/61

[56] References Cited

U.S. PATENT DOCUMENTS

| | | | |
|---|---|---|---|
| 3,836,755 | 9/1974 | Ehrat | 186/1 A |
| 4,676,343 | 6/1987 | Humble | 186/61 |
| 4,779,706 | 10/1988 | Mergenthaler | 186/61 |
| 4,787,467 | 11/1988 | Johnson | 177/50 |
| 4,792,018 | 12/1988 | Humble | 186/61 |

Primary Examiner—George H. Miller, Jr.

[57] ABSTRACT

A fast retail security weighing system is disclosed whereby if a second purchased item's product code is entered before the weight corresponding to the first purchased item's product code has been measured and verified, the system will consider the weight on the scale as corresponding to the first purchased item alone, but if such weight does not correspond with the allowed weight for the first purchased product, then the system will consider whether the weight on the scale corresponds to the summation of the first and second purchased items' weights. The fast retail security weighing system may also approximate the actual weight on the scale from the rate of weight change and the instantaneous weight reading.

15 Claims, 4 Drawing Sheets

FAST RETAIL SECURITY WEIGHING SYSTEM

FIELD OF THE INVENTION

The present invention relates to weighing systems used with retail point-of-sale machines.

BACKGROUND OF THE INVENTION

Weighing systems have been proposed for many years in a security capacity in retail environments. Typically a product code is entered (manually or via a machine bar code reader) and then the purchased product is weighed and packed. The product code directly or indirectly (via a product lookup table database) indicates how much the product should weigh, and possibly, the allowable tolerances from some ideal weight. If the product's actual weight corresponds with the weight indicated by the product code, then the probability that the correct product has been weighed and packed is significantly greater than if no such correspondence is obtained.

There has been particular interest in using weighing systems in a security capacity for retail environments for proposed automated retail point of sale systems. Many retail products contain machine readable bar codes which enable the customer to use a bar code reader to scan product's bar codes which directly or indirectly indicate allowable weight. Ehrat, U.S. Pat. No. 3,836,755, discusses a shopping cart which contains a scanning and weighing apparatus and which in conjunction with an evaluation system evaluates the correspondence of weight with product designation. Mergenthaler, U.S. Pat. No. 4,779,706, and Johnson, U.S. Pat. No. 4,787,467, discuss an automated self-service retail checkout station where customers scan and weigh purchased items. A computer system verifies weight obtained with allowable weight to make sure that the customer is not scanning a cheaper product and then packing the expensive product. Schneider, U.S. Ser. No. 07/584,104, discusses an automated point of sale machine which also requires customers to scan products and then verifies the measured weight against the allowable weight to make sure that the customer is not scanning a cheaper product and then packing the expensive product.

A major limitation of the above inventions is that only one product can be weighed at a time. Essentially, a product must be left on the weighing apparatus long enough for the weighing apparatus to produce a signal giving an adequate representation of weight. The length of time required for an adequate representation of weight is generally 2 to 3 seconds. For certain applications, this time delay may be adequate. However, there are numerous retail applications where a faster weighing time is required. For example, in supermarkets where a human cashier is aided by a bagger, the cashier is generally able to scan 36 items per minute. If an automated point of sale system is to duplicate such productivity, then the automated point of sale system must be able to obtain an adequate representation of weight in effectively less than 2 seconds.

SUMMARY OF THE INVENTION

The present invention describes both a method and apparatus which allows a weighing system, intended for retail security environments, to weigh a high rate of products per minute.

'Weight' considered herein is generally a net weight since several purchased items may be placed on a scale or in a shopping bag on a scale. The computation of net weights is well known in the prior art. A net weight is obtained by subtracting, by means at the scale or at the computation device to which the scale attaches, the previous gross weight from the current gross weight.

'Stabilized weight' herein refers to the measurement of weight (and perhaps the averaging thereof if several measurements are used to obtain a value) which is effectively equal, to within the precision of the weighing scale, to the actual weight on the scale. The measurement of a 'stabilized weight' is well known in the prior art and may be accomplished by various techniques. The simplest technique is to have a very slow weighing system and do nothing. By the time the weighing system has produced a weighing reading, the system has stabilized such that the weight reading is effectively the stabilized reading. The latter technique can be applied to a quicker weighing system by simply waiting a fixed period of time, typically 2 seconds, and assuming that at the end of this time period a weight reading will equal the true stabilized weight reading. A more sophisticated and a faster technique is to measure the weight change over predetermined time intervals. When such weight changes are within a predetermined range, e.g., 3 grams for a 25 kg capacity scale, it can be assumed that a weight reading (or an average weight reading over a short time interval starting at approximately this point in time) is equal to the stabilized weight. 'Computed weight' refers herein to the computation of a weight which approximates the 'stabilized weight' whereby the 'computed weight' is derived from unstable weight readings.

In the present invention, a scale coordinator receives a weight signal from a weighing scale and a product code signal from a product code input device, which is typically a laser bar code scanner. The scale coordinator is also typically able to disable and enable the laser beam of the laser bar code scanner. The scale coordinator is able to access the product lookup table of the point of sale terminal or computer system which gives product information such as allowable weight and weight tolerances in response to a particular product code.

The scale coordinator is typically composed of a set of memory registers, a timing means, a controller circuit, communication means between the code reader and the memory registers, communication means between the product lookup table and the controller circuit or the memory registers, communication means between the controller circuit and the scale, communication means between the controller circuit and the point of sale terminal or computer in which the weighing system functions, and a controller program which guides the operation of the controller circuit.

The scale coordinator assesses the rate at which products are being scanned. If the rate is slow enough, then the stabilized weight of the product is used. The scale coordinator typically will indirectly send the product code obtained from the laser scanner to the product lookup table, although equivalent embodiments of the present invention can directly send the product code from the code reader to the product lookup table. The scale coordinator will receive from the latter the allowable weight(s) for the product and the tolerance range(s) acceptable. If the weight measured corresponds with the weight on record, then the scale coordinator may typically indicate approval to the user. The product information is then transmitted to the point of sale terminal or computer system. However, if products are being scanned at a rate that exceeds the stabilized weighing rate of the weighing scale, then the scale coordinator will optimize utilization of the existing capabilities of the weighing system. Such optimization includes computing the weight from the instantaneous weight and the rate of weight change, using multiple scales alternatively when the particular weighing system includes more than one scale, and if the weight measured/computed does not correspond with the expected weight given by the product lookup table and if another product has been scanned by the bar code reader (or read by an equivalent code reader) then determining if such a correspondence exists between the weight measured/computed and between the sum of the expected weights for the last two items scanned.

A typical embodiment of the present invention will comprise: (a) a scale sending a first signal representative of the weight being measured; (b) a product code input device sending a second signal representative of the product code of a purchased product; (c) a timing means sending a third signal indicative of time elapsed; (d) a product lookup table receiving a signal indicative of said second signal and in return sending a fourth signal representative of allowed weights for a purchased product whose product code is indicated by the said second signal; (e) a set of memory registers receiving said fourth signal for temporary storage; (f) said set of memory registers sending a fifth signal indicative of the contents of said set of memory registers; (g) said set of memory registers receiving a first processor signal where said first processor signal causes the contents of the indicated registers to be changed; (h) a controller circuit receiving said first, third, and fifth signals where said controller circuit generates a first controller signal related to the value of the said first signal and related to the variation of the said first signal with respect to the said third signal where the said first controller signal is indicative of the weight present on the said scale and where the said controller circuit verifies the said first controller signal against the portion of the said fifth signal indicative of the contents of the registers within the said set of memory registers containing the weight information for the last purchased product and where if said verification is valid said controller circuit sends a first processor signal to said set of memory registers so as to erase the contents of the said memory registers containing the weight information for the last purchased product and sends a second processor signal to an output transmission line whose destination is the host point of sale system in which the said retail security weighing system functions and if said verification is invalid then said controller circuit sums the contents of the said registers within the said set of memory registers containing the weight information for the last purchased product with the registers within the said set of memory registers containing the weight information for the second to last purchased product and in doing so generates a second controller signal and verifies the said second controller signal against the said first controller signal and if the latter verification is valid said controller circuit sends a first processor signal to said set of memory registers so as to erase the contents of the said memory registers containing the weight information for the last purchased product and weight information for the second to last purchased product and sends a second processor signal to an output transmission line whose destination is the host point of sale system in which the said retail security weighing system functions. The signals involved will generally be electronic signals transmitted by means of electrical wires, although as one skilled in the art is aware, other means such as electro-optical, radio, etc exist to allow the transmission of signals. The numbering of the signals above is done in an arbitrary fashion simply to allow a concise description of the present invention. The first and second processor signals are signals which the controller circuit transmits to circuits external to the controller circuit (although it is conceivable in another embodiment that enough memory registers exist within the 'controller' circuit so as to allow internal manipulation of the set of memory registers) while the first and second controller signals are signals which are manipulated within the controller circuit. As described above, an essential feature of the present invention is that if a second purchased item's product code is entered before the weight corresponding to the first purchased item's product code has been measured and verified, the system will consider the weight on the scale as corresponding to the first purchased item alone, but if such weight does not correspond with the allowed weight for the first purchased product, then the system will consider whether the weight on the scale corresponds to the summation of the first and second purchased items' weights.

In certain applications it will prove advantageous to provide additional weighing scales to further increase the productivity of the weighing system. Scanned items can alternatively be placed on a series of independent weighing scales. If more than one scale is being used then the scale coordinator is able to send a signal to an indicating device which shows or tells the user which scale is available for use.

Typically a weighing scale used in a retail environment will on request return an electronic signal indicative of weight to the point of sale terminal or computer system when the signal indicating the weight on the scale remains stable within a range of a few grams. However, in the present invention, the weighing scale signal is constantly sent to the scale coordinator, where the latter computes the change of the signal with respect to time and often the rate of change of this signal. If the rate of usage of the weighing system is slow, then as noted above, the scale coordinator will typically wait for weight stability (e.g., an average change of the weight signal with respect to time of less than typically several grams) before using the measured weight signal. However, if the rate of usage of the weighing system is high and if the weight of the object on the weighing scale is needed before the scale has had time to stabilize, then the value of the signal indicating weight on the scale at that moment plus the rate of change of this signal is used by the scale coordinator to compute what the object on the scale should weigh. (In certain embodiments the scale can contain circuitry to compute the change of weight with respect to time and sometimes the rate of change of the weight as well, and transmit information indicative of the change in the weight with respect to time, to the scale coordinator. As well, in other embodiments the scale can contain additional circuitry to compute as well what the object on the scale should weigh based on the rate of change of weight. Such embodiments are effectively equivalent to the preferred embodiment of the present invention discussed herein except that weight change circuitry is displaced from the scale coordinator to the scale itself.)

DESCRIPTION OF PREFERRED EMBODIMENTS AND PRACTICES

Figure 1:
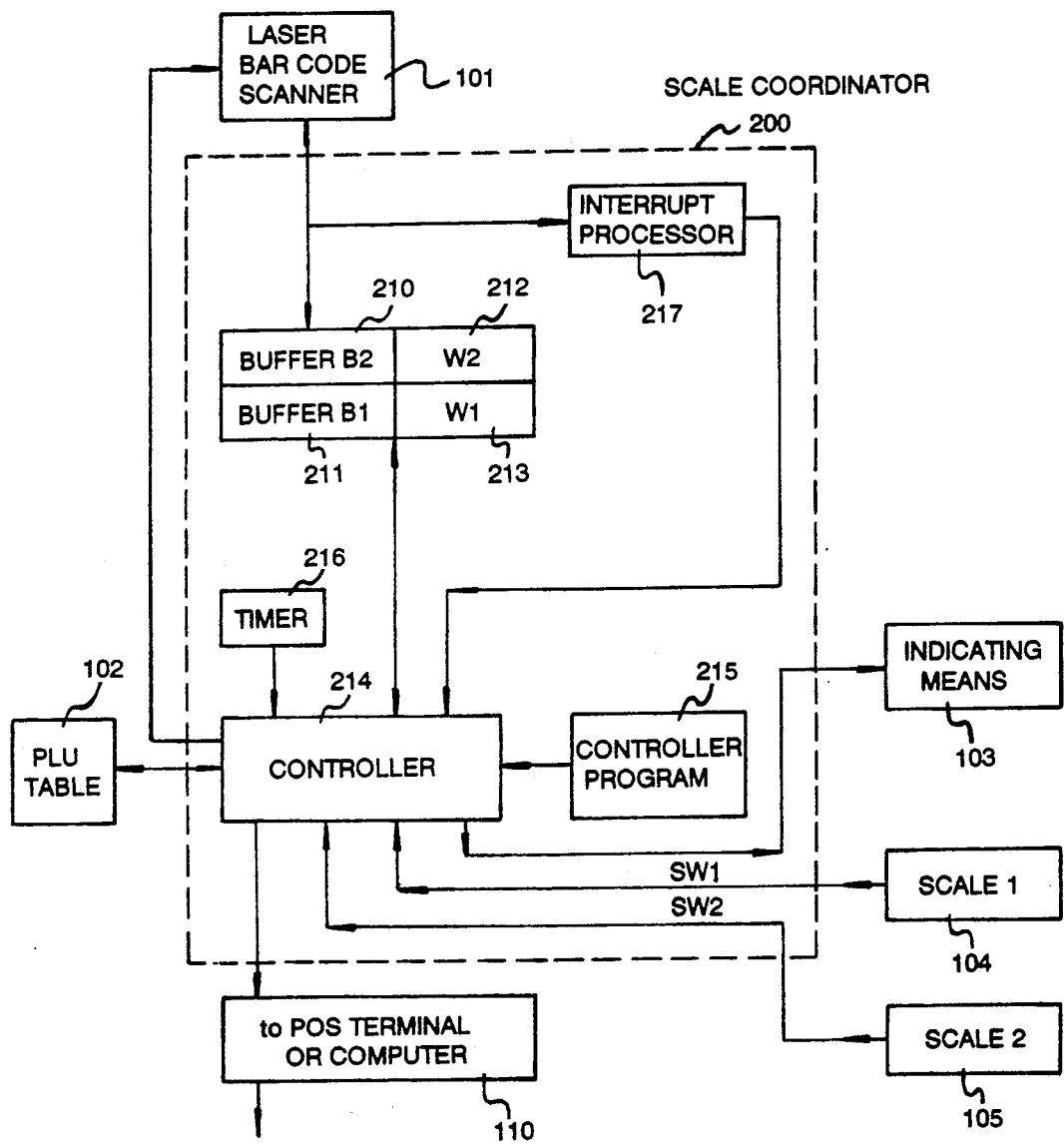
FIG. 1 is a functional diagram of a preferred embodiment of the present invention.

A functional diagram of a preferred embodiment of the present invention is shown in FIG. 1. The components which compose the scale coordinator 200 are shown within the dotted lines. The laser bar code scanner 101 sends a signal representing the bar code scanned to buffer B2 210 and to the interrupt processor 217. The laser bar code scanner 101 is a typical, commercially available laser bar code scanner. Such scanners, for example, read UPC-A, UPC-E and other bar code schemes and in response transmit an electrical signal which represents the bar code. An example of such an electrical signal would be an ASCII transmission of the bar code following an RS-232 protocol. In other embodiments, different types of bar code readers or scanners, could be used to convert the bar code on a product into an electrical signal representative of the bar code. Similarly, in other embodiments, it is possible that laser bar code scanner 101 be supplemented or perhaps replaced by other input devices such as keypads, optical character scanners, voice input devices, or touchscreen keypads. In all cases, an electrical signal representative of the purchased product is sent to buffer B2 210 and to the interrupt processor 217.

Buffer B2 210 is an ordinary digital register. A digital register is herein considered to be a set made up of individual registers and optionally subregisters within the individual registers. For example, the digital register could hold contents representing a product code where the individual registers contain the bytes making up this product code and the subregisters contain the bits making up the bytes. Similarly, the digital register buffer B2 210 can be considered to belong to a larger set of digital registers, in the case of the simple embodiment being presented here encompassing buffers B2 210, B1 211, W2 212 and W1 213. The capacity of buffer B2 210 is typically 20 bytes, enough to hold the product code transmitted from laser bar code scanner 101. Buffer B2, under the control of controller 214, is capable of transferring its contents to a similar digital register, buffer B1 211. Buffer W2 212 and buffer W1 213, are similar ordinary digital registers. The function of buffers W2 212 and W1 213 are to hold the allowable weight range corresponding to the product code in buffers B2 210 and B1 211, respectively. Buffer W2, under the control of the controller 214, is capable of transferring its contents to buffer W1. Although shown physically adjacent in FIG. 1, buffers B2 210 and W2 212 (and B1 211 and W1 212 similarly) do not actually communicate directly with each other. In FIG. 1, buffers B2 210, B1 211, W2 212 and W1 213 are shown as discrete entities. However, in other embodiments, for economical reasons, it is likely that the said buffers would consist of a tiny segment of a RAM (random-access-memory) semiconductor integrated circuit that typically has the capacity to hold the equivalent of many thousands of such buffers. Also, for sake of simplicity, FIG. 1 shows only two levels of buffers between the controller 214 and the laser bar code scanner 101. In other embodiments, it is possible to have many more buffers than the two levels shown in FIG. 1.

The interrupt processor 217 shown in FIG. 1 is a common element of modern computer circuits. It is possible to build the present invention without an interrupt processor 217, but in such a case, the controller 214 must continually poll the buffer B2 210 to see if an input has arrived from the laser bar code scanner. The advantage of the interrupt processor 217 is to alert the controller immediately to the arrival of a signal from the laser bar code scanner 101. In the embodiment of the present invention shown in FIGS. 1, 2 and 3, when such an 'interrupt' occurs, the controller 214 will stop whatever it is doing (saving the intermediate results if necessary), perform the functions shown in the interrupt processing routine shown in FIG. 2, and then resume what it was doing before the interrupt occurred.

Figure 2:
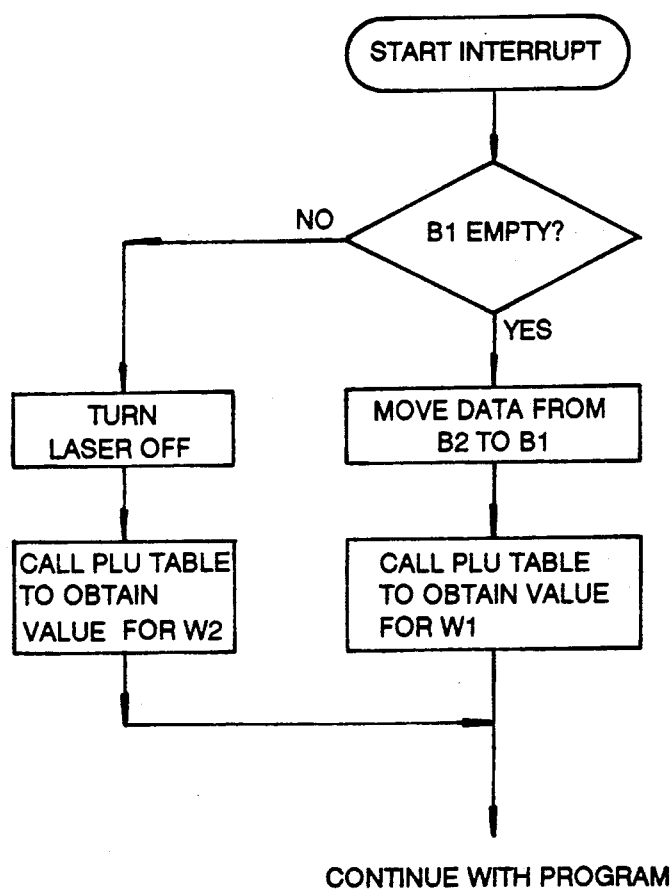
FIG. 2 is a flowchart of an 'interrupt routine' used by a preferred embodiment of the present invention.
Figure 3:
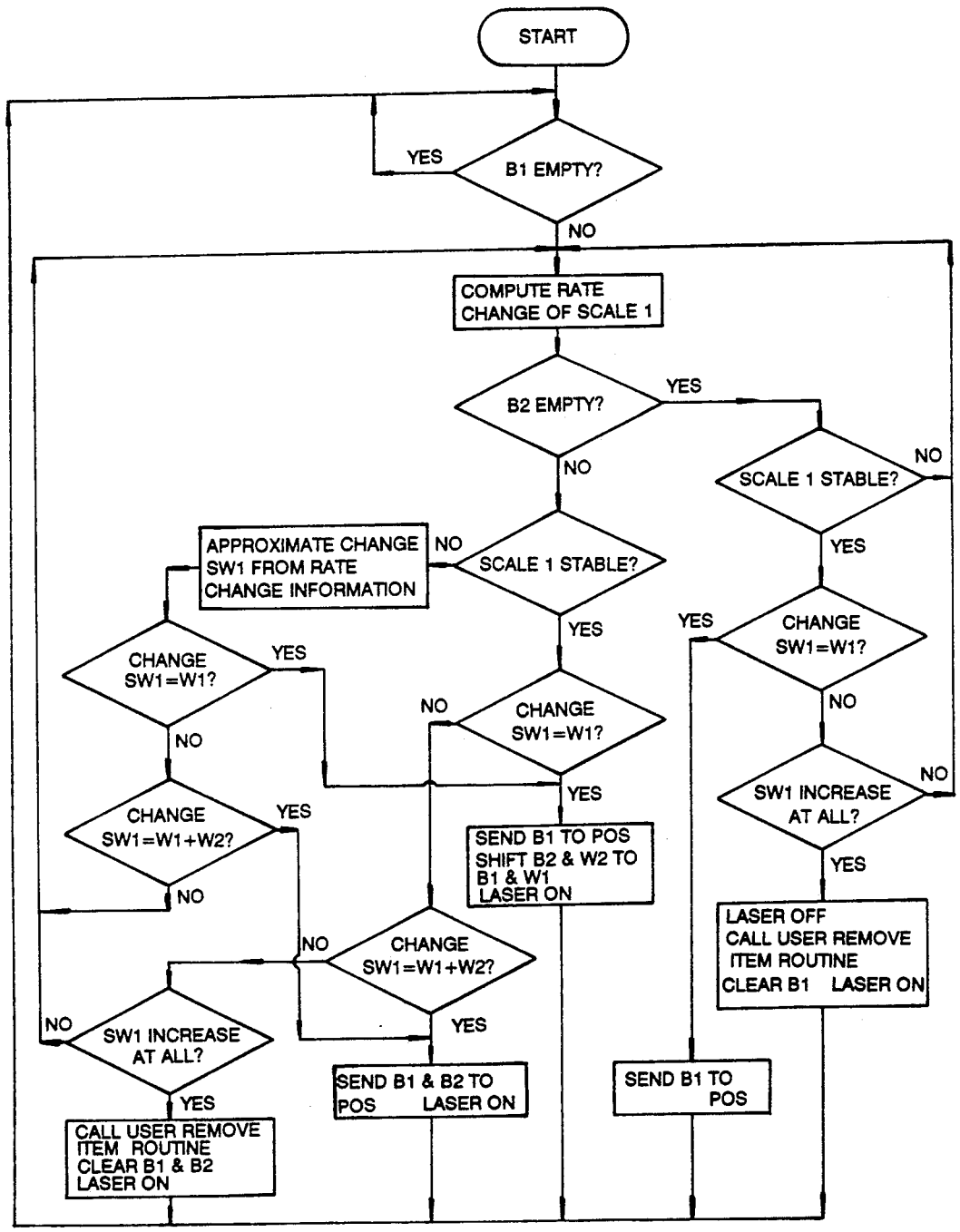
FIG. 3 is a flowchart of the main algorithm controlling the operation of a preferred embodiment of the present invention.

The controller 214 is functionally similar to a CPU (central processing unit) of a conventional computer system. Integrated circuits are commercially available which contain all the circuitry necessary for a component such as controller 214. (In fact, customized integrated circuits are commercially available which can integrate on a single semiconductor chip all of the electronic circuits shown in the scale coordinator 200.) Controller 214 receives the signals entering the scale coordinator 200, receives a timing signal from timer 216, sends and receives signals from a product lookup (PLU) table, turns the laser on or off in the laser bar code scanner 101, sends signals to an indicating means 103 and sends signals to the host point of sale (POS) terminal or computer 110. The actions controller 214 takes are determined by the algorithms present in the controller program 215. These algorithms are discussed below and are shown in FIGS. 2 and 3. Controller program 215 can be a commercially available ROM (read-only-memory) or equivalent integrated circuit. However, due to the commercial availability of inexpensive microcomputer systems, controller program 215 can in fact also exist within a magnetic disk drive and upon system initialization is transferred to a RAM (random-access-memory) integrated circuit. Other embodiments are possible using other functionally equivalent electronic circuits. It is not theoretically necessary to use modern integrated circuits nor software techniques as it is theoretically possible to construct the controller 214 and the controller program 215 out of discrete transistors, resistors and diodes.

In the embodiment of the present invention shown in FIG. 1, scale 1 104 and scale 2 105 continually send weight readings ('SW1' and 'SW2' respectively) to controller 214 of the scale coordinator 200. In the embodiment shown, the weight readings from scale 1 104 and scale 2 105 do not activate interrupt processor 217. Thus, in the shown embodiment, controller 214 obtains weight readings by polling. If weight readings are transmitted from the scales at, for example, 20 times per second, then it is of little consequence if controller 214 misses weight readings when it is performing other functions. However, other embodiments of the present invention could use buffers and/or interrupt processing for the weight readings. Also, as mentioned above, in other embodiments, the scales themselves could process the weight readings, whereby stable readings would typically be sent, with unstable readings along with optionally a rate of change value available upon demand. As mentioned above, other embodiments are possible where the system only uses one scale, as well as other embodiments where there are more than the two scales shown in FIG. 1.

The indicating means 103 receives a signal from controller 214. Indicating means 103 can be used for different functions in various embodiments. In the embodiment shown in FIG. 1, indicating means 103 would indicate to the user which scale is available for use. The customer could alternatively use scale 1 104 and scale 2 105 to reduce the waiting time for scale stabilization as in the case of a single scale system. (While the scale coordinator 200 is waiting for a given scale to stabilize for a stabilized weight reading, the customer can be using the second scale. By the time the customer has finished using the second scale it is assumed that a stabilized weight reading is obtained from the first scale and thus the customer can use the first scale now while the scale coordinator 200 waits for a stabilized reading from the second scale. Additional scales could be used if the customer's usage rate exceed the weighing rate of such a system.) As well, the indicating means could advise the customer whether a product was accepted by the system or whether the customer is obligated to remove and rescan that item. Indicating means 103 can consist of a video display terminal, light-emitting-diodes (LEDs), a liquid crystal display (LCD), an audio speaker or buzzer, a voice synthesizer, or any other visual and/or audio transducer.

The product lookup (PLU) table 102 contains a listing of allowable weight ranges for the various product codes the system is expected to process. In the embodiment shown, the controller 214 fetches the scanned bar code product code from buffer B1 211 or buffer B2 210 and sends this product code to PLU table 102. PLU table 102 in return sends to the controller 214 the allowable weight ranges for that product code. In the embodiment shown, the controller 214 then typically stores (following the algorithm in the controller program 215) the allowable weight ranges in buffer W1 213 or W2 212. The PLU table 102 typically physically consists of another computer system. The PLU table 102 can reside in the magnetic disk memory or the semiconductor random-access-memory of the computer system. The PLU table 102 will typically reside in the computer system that the POS terminal attaches to, or, in the computer system which operates the POS terminal. In other embodiments, it is possible to conceive of the PLU table 102 as residing within the scale coordinator 200. It is also possible to conceive of equivalent embodiments of the present invention whereby the PLU table 102 directly receives the product code from the laser bar code scanner 101 and in return directly places the allowable weight ranges in buffer W1 213 or W2 212. In the simple embodiment of the present invention depicted in FIGS. 2 and 3, a single weight value is considered. However, actual embodiments need to consider a weight value in terms of a low and high acceptable range, where such range typically varies from product to product. Also, occasionally there may be two or more variations of the same product with the same product code. In such cases, an alternate weight value implying an alternate low and high range must be considered if the principal weight value does not correspond with measured weight values.

As mentioned above, the controller 214 follows an algorithm which physically resides in the controller program 215. A simple embodiment of this algorithm is depicted in FIGS. 2 and 3. For the sake of simplicity, the algorithm shown in FIGS. 2 and 3 makes use of only one scale, scale 1 104. However, other embodiments of the present invention are possible whereby the algorithm in controller program 215 makes use of two or more scales.

As mentioned above, when a product is scanned, the laser bar code scanner 101 will send a representative signal to buffer B2 210 and to the interrupt processor 217. In turn, the interrupt processor 217 causes the controller 214 to stop whatever it is doing (saving the intermediate results if necessary) and execute an interrupt routine, which is a portion of the general algorithm stored in the controller program 215. A simple embodiment of the interrupt processing routine is shown in FIG. 2. The controller 214 will first check to see if buffer B1 211 is empty. If buffer B1 211 is empty, then the controller 214 will move the contents of buffer B2 210 to buffer B1 211. The controller 214 then sends a signal representative of the product code now present in buffer B1 211 to the PLU table 102. The PLU table in return sends back to the controller 214 the allowable weight ranges for that product code. The controller 214 then stores the allowable weight ranges in buffer W1 213. The interrupt processing routine then ends, and controller 214 resumes its functions present at the moment when the interrupt occurred.

In the case whereby buffer B1 211 is not empty, then the controller will disable the laser of the laser bar code scanner 101. The reason is that in the embodiment of the present invention shown in FIG. 1, there are only two buffer layers for product input codes. (Other embodiments of the present invention, are of course possible utilizing and processing many buffer layers.) Buffer B1 211 contains a product code. A new product code has just been placed into buffer B2 210. Should another product code be sent by the laser bar code scanner 101, then this data would be lost or would overwrite valid data present in buffer B2 210. In other embodiments, it may not be necessary to disable the laser of the laser bar code scanner 101, but to instead disable the signal transmission. Similarly, in other embodiments using other input devices such as keypads, it would somehow be necessary to disable the transmission of signals from such input devices.

After the laser of laser bar code scanner 101 is disabled, the controller 214 then sends a signal representative of the product code now present in buffer B2 210 to the PLU table 102. The PLU table in return sends back to the controller 214 the allowable weight ranges for that product code. The controller 214 then stores the allowable weight ranges in buffer W2 212. The interrupt processing routine then ends, and controller 214 resumes its functions present at the moment when the interrupt occurred.

FIG. 3 shows the major portion of the algorithm that the controller 214 follows in the simple embodiment of the present invention. The controller 214 continually checks to see if buffer B1 211 is empty. If a product code is present in buffer B1 211, then the controller 214 examines several of the weight readings from scale 1 104 over the period of a fraction of a second, and in doing so, computes the rate of change of weight on scale 1 104. The controller 214 then checks to see if buffer B2 210 is empty.

Consider the case where buffer B2 210 is empty. Thus, there is only one product which has been scanned and which is in the process of being placed on the scale 1 104. The controller 214 will then check to see if scale 1 104 is stable, one technique being checking to see if the weight readings are being received within a narrow range. If the scale is still not stable, then the controller will again examine several weight readings over a fraction of a second in order to compute the change of weight with respect to time and possibly the rate of change of the weight measured on the scale 1 104. If the scale 1 104 is in fact stable, then the controller 214 is then instructed to see whether the change of weight (i.e., the increase in weight) on scale 1 104 ('Change SW1') is equal to a value within the weight range for that product code, as stored in register W1. If this is the case, then it is assumed that the product scanned has been placed on scale 1 104. Thus, the controller sends the product code stored in buffer B1 211 to the POS terminal or computer system 110. The routine then starts over again. If 'Change SW1' does not equal a value within the weight range for that product code, then the controller will first check to see if the product has yet been placed on the scale 1 104 (i.e., has 'SW1' increased at all?), and if so, the controller then disables the laser of laser bar code scanner 101, and calls a sub-algorithm which asks the operator or customer to remove the last item placed on scale 1 104. Once the weight on scale 1 104 has returned to the previous value (i.e., the last item has been removed), the buffer B1 211 is cleared, the laser of laser bar code scanner 101 is enabled, and the routine starts over again.

Consider the case where buffer B2 210 is not empty. The implication is that there are two products which have been scanned and whose weights have not yet been accepted by the system. In the simple embodiment being shown in FIGS. 2 and 3, only two levels of buffers are being used. Thus, at this point the laser of laser bar code scanner 101 has been disabled, and no further products can be scanned. Of course, it is possible to conceive of other embodiments of the present invention whereby there are additional levels of buffers being used. Similarly, in the simple embodiment being shown in FIGS. 2 and 3, only one scale, scale 1 104, is being considered. It is possible to conceive of other embodiments of the present invention whereby there are two or more scales being used. In such embodiments, the user would be prompted to use the alternative scale while the weight on one scale was stabilizing.

Continuing the case whereby buffer B2 210 is not empty, the controller 214 then checks to see if scale 1 104 is stable, i.e., are the weight readings being received within a narrow range. Consider the case whereby scale 1 104 is considered stable. The controller 214 then checks to see if the 'Change SW1' of scale 1 104 is equal to the weight allowed for the first product scanned, and stored in buffer W1 213. If so, then it can be assumed that the product placed on the scale is the product first scanned. The product's code, as stored in buffer B1 211 will be sent by the controller 214 to the POS terminal or computer system 110. The contents of buffers B2 210 and W2 212 are then transferred respectively to buffers B1 211 and W1 213. The laser of laser bar code scanner 101 is then turned back on since buffer B2 210 remains available for the next product to be scanned, and the routine starts over again. If the 'Change SW1' of scale 1 104 is not equal to the weight allowed for the first product scanned, and stored in buffer W1 213, then the controller checks to see if the 'Change SW1' is equal to the combined weights of the first and second products scanned, where the allowable weights are given by the summation of the contents in buffers W2 212 and W1 213. If so, both products' codes, as stored in buffers B1 211 and B2 210, are sent to the POS terminal or computer 110, the laser of laser bar code scanner 101 is enabled and the routine starts again. If the 'Change SW1' is not equal to weight stored in W1 213 or the summation of the weights stored in W1 213 and W2 212, then this implies that an unauthorized object has been placed on the scale 1 104. First, the controller 214 makes sure that the reason 'SW1' does not equal any of the allowable values is because it hasn't changed yet because neither the first or second scanned product has yet been placed on the weighing scale 1 104. Assuming that 'SW1' has increased, then the controller will call a sub-algorithm that asks the user or operator to remove the last one or two items from the scale 1 104. The sub-algorithm then clears buffers B1 211 and B2 210, enables the laser and the routine starts over again.

Continuing the case whereby buffer B2 210 is not empty, but scale 1 104 is not stable. Since there is data present in both buffers B1 211 and B2 210, this indicates that two products have been scanned and their weights have yet to be verified. If the controller 214 waits until the weight on scale 1 104 is stable, this will significantly reduce the productivity of the present invention. Thus, the controller 214 will compute the weight on the scale from the last 'SW1' weight measurement and from the rate of change of such 'SW1' measurements. The controller program 215 contains a sub-algorithm which computes what the stabilized weight would be from the current unstable readings. One technique or algorithm to obtain a 'computed weight' makes use of the fact that weighing scales tend to yield characteristic measurements of weight from the moment a weight is placed on the scale until a stabilized weight is obtained. The shape of such weight versus time curves depends on the manner in which the scale is constructed, i.e., the properties of the load sensing element and the damping of the scale platform. With a knowledge of the weight versus time curve for a particular class of scales, before a stable weight has been achieved, it is possible by measuring the instantaneous weight and the rate of change of weight with respect to time to determine the approximate position on the weight versus time curve and to extrapolate to and thus approximate the stabilized weight of the weight currently on the scale.

After the controller 214 has computed an approximate value for the weight on scale 1 104, it then subtracts the previous value of SW1 from this value to obtain the change of weight ('Change SW1') on scale 1 104. 'Change SW1' should be a positive number equal to the contents of buffer W1 213 if the first product scanned has been placed on scale 104, or equal to the contents of buffer W1 213 and buffer W2 212 if both the first and second products scanned have been placed on scale 104. If either of these correspondences exist, then the controller 214 will send the contents of buffer B1 211, and buffer B2 210 if appropriate, to the POS terminal or computer system 110, the laser is enabled and the routine starts again. If no such correspondence exists, then the controller will measure again for a short period of time the weight readings 'SW1' being received from scale 1 104 in order to compute again the rate of change of weight on scale 1. The controller 214 then checks again to see if scale 1 104 is stable, or if not, it will again approximate what the stable weight should be on scale 1 104.

It is possible to conceive of other embodiments of the present invention whereby the algorithm present in the controller program 215 supports additional scales. In such embodiments, the productivity of the system would be greater since the user of system could be instructed via the indicating means 103 to alternatively use different scales, thus allowing scales time to stabilize. However, such an embodiment would still follow the principles shown in the algorithm shown in FIG. 3. Weights measured would have to equal allowable weights given by the PLU table 102 for specific product codes. As well, although not as necessary as in a single scale system, should the scanning rate exceed the rate of all the scales to accept products for weighing, it would be useful for the controller 214 in such cases to approximate the stable weight on the scales, thus allowing the productivity of the system to be even higher.

Figure 4:
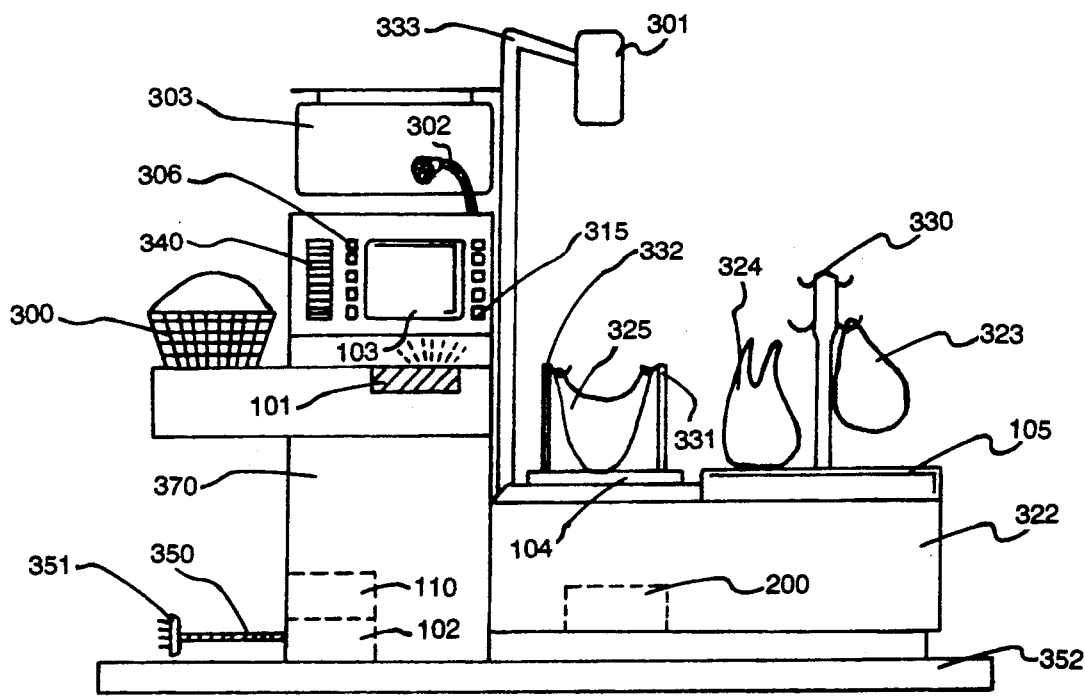
FIG. 4 is a perspective view of a preferred embodiment of the present invention.

FIG. 4 is a perspective view of a preferred embodiment of the present invention used in conjunction with an automatic point of sale machine. Basket 300 contains the products the customer has selected for purchase. The customer removes a product from basket 300 and scans the bar code on the product over the laser bar code scanner 101 and then deposits the purchased product into bag 325 supported by supports 331 and 333 which attach to scale 1 104. In the embodiment shown in FIG. 4 the PLU table 102 and the point of sale computing means 110 are within the first cabinet 370 of the self-service point of sale machine, and the scale coordinator 200 is within the second cabinet 322 (both cabinets being affixed to floor mounting bracket 352) of the self-service point of sale machine. A communications cable 350 terminating in connector 351 allows the point of sale computing means 110 to communicate with other such automatic point of sale machines as well as with larger minicomputers and mainframe computer systems. The video display 103 is used as an user output interface indicating means synergistically for both the scale coordinator 200 and the point of sale computing means 110. Speaker system 340 is used synergistically as an user output interface indicating means for the scale coordinator 200, the point of sale computing means 110 and in conjunction with microphone 302 to allow two way conversations with a remote human support employee. Poster 303 provides printed instructions. User input buttons 306 to 315 allow the user to manually enter information to both the point of sale computing means 110 and the scale coordinator 200. For example, if a bar code is defective or absent, the customer will need to use buttons 306 to 315 to enter a product code for the product. In such cases, in the embodiment shown in FIG. 4, video camera 301 supported by pole 333 transmits a video image of the product placed in bag 325. The embodiment shown in FIG. 4 contains a second scale, scale 2 105. Scale 2 105 contains a bag support pole 330 and in FIG. 4 bag 323 is resting on support pole 330 while bag 324 is resting on the platform of scale 2 105. Scale 2 105 is generally used as a storage scale to store filled bags from scale 1 104. From a security point of view, customers cannot add any nonscanned/noninputted product to a bag since the weight on scale 2 105 is transmitted both to point of sale computing means 110 and the scale coordinator 200, and should an authorized weight change be noted by the point of sale computing means 110, the user will be so prompted by video screen 103 and speaker system 340. Scale 2 105 can also be used for direct placement of bulky items, and so to increase the productivity of the self-service point of sale machine it is useful for a customer to place a product into the bag 325 and while scale 1 104 is stabilizing, the customer can place a product onto scale 2 105.

Those skilled in the art will be able to ascertain, using no more than routine experimentation, other equivalents for the method and apparatus above described. Such equivalents are to be included within the scope of the following claims.

I claim:
1. A retail security weighing system comprising:
(a) a scale sending a first signal representative of the weight being measured;
(b) a product code input device sending a second signal representative of the product code of a purchased product;
(c) a timing means sending a third signal indicative of time elapsed;
(d) a product lookup table receiving said second signal and in return sending a fourth signal representative of allowed weights for a purchased product whose product code is indicated by the said second signal;
(e) a set of memory registers receiving said fourth signal for temporary storage;
(f) said set of memory registers sending a fifth signal indicative of the contents of said set of memory registers;
(g) said set of memory registers receiving a first processor signal from a controller circuit;
(h) said controller circuit receiving said first, third, and fifth signals where said controller circuit generates a first controller signal related to the value of the first said signal and related to the variation of the said first signal with respect to the said third signal where the said first controller signal is indicative of the weight present on the said scale and where the said controller circuit verifies the said first controller signal against the portion of the said fifth indicative of the contents of the registers within the said set of memory registers containing the weight information for the last purchased product and where if said verification is valid said controller circuit sends a first processor signal to said set of memory registers so as to erase the contents of the said memory registers containing the weight information for the last purchased product and sends a second processor signal to an output transmission line whose destination is the host point of sale system in which the said retail security weighing system functions and if said verification is invalid then said controller circuit via the said fifth signal sums within a controller circuit register the contents of the said registers with the said set of memory registers containing the weight information for the last purchased product with the contents of the registers within the said set of memory registers containing the weight information for the second to last purchased product and in doing so generates a second controller signal indicative of said controller circuit register and verifies the said second controller signal against the said first controller signal and if the latter verification is valid said controller circuit sends a first processor signal to said set of memory registers so as to erase the contents of the said memory registers containing the weight information for the last purchased product and weight information for the second to last purchased product and sends a second processor signal to an output transmission line whose destination is the host point of sale system in which the said retail security weighing system functions.

2. The retail security weighing system of claim 1 containing a circuit capable of inhibiting further signals from the said product code input device when the capacity of the system has been exceeded.

3. The retail security weighing system of claim 1 where there are additional said scales which can alternatively be used by the user.

4. The retail security weighing of claim 1 containing an indicating means whose output is controlled by the said controller circuit.

5. The retail security weighing system of claim 1 containing an interrupt processor circuit which alerts the said controller circuit to the generation of a new said second signal.

6. The retail security weighing system of claim 1 containing an interrupt processor circuit which alerts the said controller circuit to the arrival of said first signal.

7. The retail security weighing system of claim 1 where the said second signal is stored within the said set of memory registers.

8. The retail security weighing system of claim 1 where if said verifications are invalid, the weight information corresponding to the third to last purchased product is summated to the second controller signal and said verification is repeated.

9. The retail security weighing system of claim 1 where the said controller circuit generates a first controller signal related to the value of the said first signal and related to the variation of the said first signal with respect to the said third signal where the said first controller signal is indicative of the weight present on the said scale and where the said controller circuit verifies the changes in said first controller signal against the portion of the said fifth signal indicative of the contents of the registers within the said set of memory registers containing the weight information for the last purchased product and where if said verification is valid said controller circuit sends a first processor signal to said set of memory registers so as to erase the contents of the said memory registers containing the weight information for the last purchased product and sends a second processor signal to an output transmission line whose destination is the host point of sale system in which the said retail security weighing system functions and if said verification is invalid and if the contents of the said set of memory registers indicate that another product code has since been received, then said controller circuit sums the contents of the said registers within the said set of memory registers containing the weight information for the last purchased product with the registers within the said set of memory registers containing the weight information for the second to last purchased product and in doing so generates a second controller signal and verifies the said second controller signal against the said first controller signal and if the latter verification is valid said controller circuit sends a first processor signal to said set of memory registers so as to erase the contents of said memory registers containing the weight information for the last purchased product and weight information for the second to last purchased product and sends a second processor signal to an output transmission line whose destination is the host point of sale system in which the said retail security weighing system functions.

10. The retail security weighing system of claim 1 where the said product code input device is a laser bar code scanner.

11. The retail security weighing system of claim 1 where the said product code input device is a keypad.

12. The retail security weighing system of claim 1 where the said scale computes the rate of weight change.

13. The retail security weighing system of claim 1 where there are more than one of said scale which can alternatively be used by the user and where there is an indicating means which advises the user which scale is available for usage.

14. The retail security weighing system of claim 1 where the said controller circuit generates a first controller signal related to the value of the first signal and related to the variation of the said first signal with respect to the third signal where the said first controller signal is indicative of the weight present on the said scale and where the said controller circuit verifies the said first controller signal against the portion of the said fifth signal indicative of the contents of the registers within the said set of memory registers containing the weight information for the last purchased product and where if said verification is valid said controller circuit sends a first processor signal to said set of memory registers so as to erase the contents of the said memory registers containing the weight information for the last purchased product and sends a second processor signal to an output transmission line whose destination is the host point of sale system in which the said retail security weighing system functions and if said verification is invalid the user is prompted by output user interface means to remove the said purchased product from the said scale.

15. The retail security weighing system of claim 1 where the said timing means, the said set of memory registers, the said controller circuit and a program controlling the said controller circuit reside within a single semiconductor chip.

* * * * *